United States Patent
Nakamura et al.

(10) Patent No.: US 6,409,330 B1
(45) Date of Patent: Jun. 25, 2002

(54) SUBLIMATION TRANSFER INK JET RECORDING METHOD AND INK COMPOSITION FOR USE THEREIN

(75) Inventors: Hiroto Nakamura; Hidehiko Komatsu; Akio Owatari, all of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/508,225

(22) PCT Filed: Jul. 14, 1999

(86) PCT No.: PCT/JP99/03807

§ 371 (c)(1),
(2), (4) Date: Mar. 8, 2000

(87) PCT Pub. No.: WO00/04103

PCT Pub. Date: Jan. 27, 2000

(30) Foreign Application Priority Data

Jul. 14, 1998 (JP) .......................................... 10-199144
Apr. 14, 1999 (JP) .......................................... 11-107186

(51) Int. Cl.⁷ .................................................. B41J 2/01
(52) U.S. Cl. ...................................... 347/103; 347/101
(58) Field of Search ................................. 347/101, 102, 347/103, 100

(56) References Cited

U.S. PATENT DOCUMENTS

| | | | |
|---|---|---|---|
| 5,488,907 A | 2/1996 | Xu | 101/488 |
| 5,640,180 A | 6/1997 | Hale | 347/3 |
| 6,000,793 A | * 12/1999 | Inamoto | 347/101 |

FOREIGN PATENT DOCUMENTS

| | | | | |
|---|---|---|---|---|
| EP | 0763568 | | 3/1997 | |
| EP | 0763569 A1 | * | 12/1997 | ........... C09B/23/02 |
| FR | 2229554 | | 12/1974 | |
| GB | 1565047 | * | 4/1980 | ............. D06P/5/00 |
| JP | 5353414 | | 5/1978 | |
| JP | 53(1978)-53414 | | 5/1978 | ........... B41M/3/12 |
| JP | 53(1978)-55221 | | 5/1978 | ........... B41M/3/12 |
| JP | 5365483 | | 6/1978 | |
| JP | 657656 | | 3/1994 | |
| JP | 10130550 | | 5/1998 | |

OTHER PUBLICATIONS

English Abstracts of Japan, 53–65483.
English Abstracts of Japan, 53–53414.
Patent Abstracts of Japan, 10–130550, Publication Date May 19, 1998.
Patent Abstract of JP, 6–57656, Publication Date Mar. 3, 1994.
Derwent Abstract 53(1978)–53414, May 15, 1978.
Derwent Abstract 53(1978)–55221, May 19, 1978.

* cited by examiner

*Primary Examiner*—John Barlow
*Assistant Examiner*—Manish Shah
(74) *Attorney, Agent, or Firm*—Ladas & Parry

(57) ABSTRACT

Disclosed are an ink composition which can satisfy, on a high level, various property requirements for ink compositions for use in ink jet recording (e.g., excellent ejection stability and realization of images free from feathering or color-to-color bleeding) and can realize good images by sublimation transfer. A sublimation transfer ink jet recording method using the ink composition is also disclosed. The ink composition comprises a heat transferable dye, a glycol ether, an acetylene glycol surfactant, and water. This ink composition is printed by ink jet recording onto an intermediate transfer medium to form a latent image on the intermediate transfer medium, and the intermediate transfer medium is then put on the surface of a receptor object, followed by heating of the intermediate transfer medium at a sufficient temperature and for a sufficient time to sublimate the heat transferable dye and to deposit the sublimated dye onto the surface of the receptor object. This recording method can realize good transferred images suffering from minimized bleeding.

10 Claims, No Drawings

SUBLIMATION TRANSFER INK JET RECORDING METHOD AND INK COMPOSITION FOR USE THEREIN

BACKGROUND OF THE INVENTION

1. Field of the Invention

The present invention relates to a sublimation transfer ink jet recording method and an ink composition for the same.

2. Background Art

Ink jet recording is a method wherein ink droplets are ejected through fine nozzles to record letters or figures onto the surface of a recording medium. Ink jet recording methods are roughly classified into two types. The first type is a continuous type wherein a strong electric field is applied between a nozzle and an electrode provided ahead of the nozzle to regulate the impact position of the ink. This type has been mainly used in industrial applications. The second type is a drop-on-demand type which, in recent years, has become extensively used in ink jet printers. This type has been put to practical use as a method wherein an electric signal is converted by means of an electrostriction element to a mechanical signal which selectively ejects ink reservoired in a nozzle head portion to record letters or symbols on the surface of a recording medium and a method wherein ink, reservoired in the nozzle head, in its portion very close to the ejection portion is rapidly heated to evolve bubbles and, by taking advantage of volume expansion of the bubbles, the ink is intermittently ejected to record letters or symbols onto the surface of the recording medium.

Application of this ink jet recording method to sublimation textile printing or sublimation transfer printing has been proposed in the art.

For example, Japanese Patent Publication No. 42317/1985 discloses a method wherein an ink containing a sublimation dye and triethylene glycol is printed by ink jet recording onto a support having thereon an ink penetration preventive layer to form a transfer image which is then put on a receptor object, such as a polyester fiber, followed by heat treatment to transfer the image onto the receptor object.

U.S. Pat. No. 5,488,907 discloses a method wherein an ink comprising a heat-active dye, at least one emulsifying enforcing agent for shielding the dye, and at least one solvent is printed onto a recording medium by ink jet recording to form thereon an image which is then heated to the activation temperature of the heat-active dye or above to transfer the image onto an object.

In recent years, there has been remarkable technical innovation in ink jet recording, particularly drop-on-demand type ink jet recording. For example, an increase in resolution of printed images by increasing the density of ink ejection head nozzles and an increase in image writing speed by adopting a multi-nozzle system or by increasing the ink ejection frequency have been attempted. Therefore, ink compositions, which can cope with increased resolution and increased speed, are also required of the sublimation transfer ink jet recording method.

SUMMARY OF THE INVENTION

The present inventors have now found that an ink composition having a specific composition, when used with sublimation transfer ink jet recording, can realize the formation of high-quality images on receptor objects. More specifically, the present inventors have found an ink composition which has good ejection stability and, at the same time, can realize good dye transferred images.

Accordingly, it is an object of the present invention to provide an ink composition which can satisfy, on a high level, various property requirements required of ink compositions for ink jet recording (for example, properties such as excellent ejection stability and capability of realizing images free from feathering or color-to-color bleeding) and, at the same time, upon sublimation transfer of the image yielded by the ink composition, can realize good dye transferred images.

It is another object of the present invention to provide a sublimation transfer ink jet recording method which can realize good images.

According to one aspect of the present invention, there is provided an ink composition for use in a sublimation transfer ink jet recording method, comprising at least a heat transferable dye, a glycol ether, an acetylene glycol surfactant, and water.

According to another aspect of the present invention, there is provided a sublimation transfer ink jet recording method comprising the steps of: printing an ink composition containing a heat transferable dye by ink jet recording onto an intermediate transfer medium to form a latent image on the intermediate transfer medium; putting the intermediate transfer medium on the surface of a receptor object; and heating the intermediate transfer medium at a sufficient temperature and for a sufficient time to sublimate the heat transferable dye and to deposit the sublimated dye onto the surface of the receptor object, the ink composition being the above ink composition of the present invention.

DETAILED DESCRIPTION OF THE INVENTION

Ink Composition

The ink composition of the present invention comprises at least a heat transferable dye, a glycol ether, an acetylene glycol surfactant, and water.

Heat Transferable Dye

The details of a sublimation transfer method using the ink composition according to the present invention are as described below. This method is the application of a carrier dyeing method using a disperse dye, wherein molecular gaps of fibers are increased and the fibers are colored with a dye by utilizing van der Waals force or hydrogen bond force. Therefore, according to the present invention, the heat transferable dye is preferably a disperse dye. In addition to disperse dyes, some of azoic dyes, vat dyes, or cationic dyes can be utilized in the present invention so far as sublimation transfer can be carried out in a proper temperature range.

Examples of preferred heat transferable dyes include disperse dyes, such as (1) C.I. Disperse Yellow 1, 3, 4, 5, 7, 8, 31, 33, 39, 42, 54, 60, 61, 64, 83, and 124, (2) C.I. Disperse Red 1, 4, 5, 7, 11, 12, 13, 15, 17, 31, 32, 33, 34, 35, 36, 52, 54, 55, 56, 58, 60, 72, 73, 76, 80, 84, 88, 91, 92, 93, 99, 111, 113, 135, 204, 205, 206, 207, 224, 225, 227, 239, and 240, and (3) C.I. Disperse Blue 20, 26, 54, 55, 56, 58, 60, 61, 62, 64, 72, 79, 81, 85, 87, 90, 91, 92, 94, 97, 98, 99, 103, 104, 105, 106, 108, 128, 148, 149, 176, 186, 187, 193, 194, 195, 197, 201, 205, 207, 211, 212, 213, 214, 215, 216, 217, 218, 219, 220, 221, 222, 223, 224, 225, 226, and 227. Vat dyes as other examples of dyes include C.I. Vat Red 41.

As the heat transferable black dye, a mixed disperse dye is preferred.

The ink composition according to the present invention contains an acetylene glycol surfactant. The addition of the acetylene glycol surfactant has the effect of reducing the foaming of the ink. Therefore, according to the present invention, the use of the acetylene glycol surfactant can reduce a failure, of the ink ejection head to eject ink, derived from the occurrence of foams within the head. Further, the acetylene glycol surfactant, in combination with a glycol ether solvent described below, can enhance the penetration of the ink into recording paper and, at the same time, can prevent uneven bleeding of images (color-to-color bleeding).

Examples of preferred acetylene glycol surfactants include Surfynol 104, 420, 440, 465, 485, 504, 61, DF-110D, DF-210, DF-37, DF-58, DF-75, SF-F, TG, GA, CT-111, CT-136, CT-151, PSA-204, PSA-216, PSA-336, OP-340, OP-350, 104S, and DF-110S (all the above products being manufactured by Air Products and Chemicals Inc.). Various types of Surfynol ranging from water-soluble types to oleaginous types are available. According to the present invention, preferably, the type of Surfynol and the amount thereof added are properly determined from the viewpoints of regulating the penetration of the ink into the paper, the wettability of the ink ejection head in its nozzle face, and stable dissolution of Surfynol in the ink. The amount of Surfynol added is generally about 0.01 to 5% by weight, preferably about 0.1 to 3% by weight.

The ink composition according to the present invention contains a glycol ether. The glycol ether, in combination with the acetylene glycol surfactant, can enhance the penetration of the ink into recording paper and, at the same time, can prevent uneven bleeding of images (color-to-color bleeding).

Examples of preferred glycol ethers, which are contained in the ink composition for ink jet recording according to the present invention, include di- or tri-ethylene glycol monobutyl ether, mono- or di-propylene glycol monobutyl ether, di- or tri-ethylene glycol mono-pentyl or -hexyl ether, propylene glycol mono- or di-ethylene glycol mono-butyl, -pentyl, or -hexyl ether, and ethylene glycol mono- or di-propylene glycol mono-butyl, -pentyl, or -hexyl ether. They may be used alone or as a mixture of two or more.

The glycol ether has low water solubility. Therefore,when the amount of the glycol ether added is large, the glycol ether sometimes causes phase separation at room temperature. In this case, the glycol ether cannot be added in a large amount to the ink. when highly water-soluble glycol ether or an organic solvent is added simultaneously with the glycol ether, the amount of the glycol ether having low water solubility added can be increased.

Although the amount of the glycol ether added may be properly determined, the amount is preferably about 5 to 20% by weight. The above amount of the glycol ether can ensure good penetration of the ink composition into the intermediate transfer medium (for example, paper). In addition, the ink composition can be easily brought to a viscosity suitable for ink jet recording.

Further, various water-soluble surfactants may be added to the ink composition according to the present invention from the viewpoint of controlling the penetration of the ink composition, enhancing the stability of the heat transferable dye, or improving the solubility of the acetylene glycol surfactant and the glycol ether in the ink.

Specific Examples of water-soluble surfactants include: ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether; polyoxyethyleneoleic acid; ester surfactants, such as polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate; and fluorosurfactants, such as fluoroalkyl esters and salts of perfluoroalkylcarboxylic acids.

The amount of the water-soluble surfactant added is preferably not more than 3% by weight. The above amount of the water-soluble surfactant can effectively suppress the foaming of the ink composition and the thickening of the ink. In addition, unstable ejection caused by uneven wetting of the ink ejection head in its nozzles can be effectively prevented.

Further, the ink composition according to the present invention may further contain a water-soluble glycol from the viewpoint of preventing nozzle clogging caused by drying. Examples of preferred glycols include ethylene glycol, diethylene glycol, triethylene glycol, propylene glycol, dipropylene glycol, tripropylene glycol, polyethylene glycol having a molecular weight of not more than 2,000, 1,3-propylene glycol, isopropyleneglycol, isobutyleneglycol, 1,4-butanediol, 1,3-butanediol, 1,5-pentanediol, 1,6-hexanediol, glycerin, and pentaerythritol.

The ink composition according to the present invention may further contain a saccharide for the same purpose as in the addition of the water-soluble glycol. Saccharides usable herein monosaccharides and polysaccharides. Specific examples thereof include glucose, fructose, ribose, xylose, arabinose, lactose, galactose, maltose, cellobiose, sucrose, trehalose, and maltotriose. Further, alginic acid and salts thereof, cyclodextrins, and celluloses may also be used as the saccharides. The amount of the saccharide added is preferably 0.05 to 20% by weight. The above amount of the saccharide added can effectively prevent the nozzle clogging. In addition, the ink composition can be easily brought to a proper viscosity range. The amounts of the monosaccharide and the polysaccharide (for example, glucose, fructose, ribose, xylose, arabinose, lactose, galactose, maltose, cellobiose, sucrose, trehalose, or maltotriose) added are more preferably 3 to 10% by weight. The use of alginic acid and salts thereof, cyclodextrins, and celluloses in a certain amount sometimes brings about excessively high viscosity of the ink composition, and, thus, care should be taken in the addition of these materials so as not to cause this unfavorable phenomenon.

If necessary, the ink composition according to the present invention may further comprise other additives, and examples of other additives usable herein include preservatives, antimold, antioxidants, electric conductivity adjustors, pH adjustors, viscosity modifiers, surface tension modifiers, oxygen absorbers, and/or nozzle clogging preventives. The type of the additives used may be properly determined. For example, when the use of preservatives or antimold is desired, sodium benzoate, pentachlorophenol sodium, 2-pyridinethiol-1-oxide sodium, sodium sorbate, sodium dehydroacetate, and/or 1,2-dibenzothiazoline-3-one (Proxel CRL, Proxel BDN, Proxel GXL, Proxel XL-2, and Proxel TN, manufactured by ICI) may be used.

The ink composition according to the present invention preferably has a surface tension of 20 to 40 mN/m at 5 to 45° C. The temperature 5 to 45° C. is the actual service temperature of printers, and the surface tension in the above range can realize stable printing and, in addition, can effectively suppress feathering or color-to-color bleeding of images.

The ink composition according to the present invention preferably has a viscosity of 2 to 10 mPa·s at 5 to 45° C. The viscosity that is in the above range can realize a printing free from an ink droplet trajectory directionality problem.

Further, the ink composition can be printed by ink jet recording with good energy efficiency.

Sublimation Transfer Ink Jet Recording

The ink composition according to the present invention is used in sublimation transfer ink jet recording. The sublimation transfer ink jet recording method comprises the steps of: printing an ink composition containing a heat transferable dye by ink jet recording onto an intermediate transfer medium to form a latent image on the intermediate transfer medium; putting the intermediate transfer medium on the surface of a receptor object; and heating the intermediate transfer medium at a sufficient temperature and for a sufficient time to sublimate the heat transferable dye and to deposit the sublimated dye onto the surface of the receptor object.

According to the present invention, the intermediate transfer medium is not particularly limited so far as it can hold thereon a latent image yielded by the ink composition and can realize good sublimation transfer onto a receptor object. However, the use of paper as the intermediate transfer medium is preferred. According to a preferred embodiment of the present invention, a specialty paper for ink jet recording, which has been produced so as to have properties suitable for use in ink jet recording, for example, provided with an ink-receptive layer, is utilized.

According to a preferred embodiment of the present invention, the intermediate transfer medium has a property such that the penetration of ink droplets, which have been deposited thereon, into the intermediate transfer medium is completed within 2 sec. The use of the ink composition and the intermediate transfer medium, which permit the penetration of the ink composition into the intermediate transfer medium to be completed within 2 sec, can realize the formation of a latent image free from significant feathering or color-to-color bleeding.

According to another preferred embodiment of the present invention, the intermediate transfer medium is paper, and the amount of the ink deposited per $5 \times 10^{-3}$ mm$^2$ of the paper is not more than 160 ng. In this case, good latent images free from color mixing at the boundary areas between contiguous colors can be formed.

After a latent image is formed on the intermediate transfer medium, the intermediate transfer medium is put on, preferably brought into intimate contact with, a receptor object, followed by heating to transfer the latent image onto the receptor object.

According to the present invention, the receptor object is not particularly limited so far as the heat transferable dye is fixable thereon. Examples of receptor objects usable herein include fabrics, metals, potteries or ceramic whitewares, plastics, ceramics, and concrete substrates.

According to a preferred embodiment of the present invention, the heat transferable dye used in the present invention can color polyesters, acetates, and nylons. Therefore, the presence of the above material in the receptor object is preferred from the viewpoints of color properties and color density. The receptor object is more preferably a fabric of which more than 50% by weight has been accounted for by the above material, for example, a cotton-blended cloth. Further, according to another preferred embodiment of the present invention, the receptor object is coated with a material containing at least 50% by weight of polyester, acetate, or nylon.

According to a preferred embodiment of the present invention, not less than 10% of the total weight of the heat transferable dye in the latent image yielded on the intermediate transfer medium is transferred onto an object from the viewpoint of good color properties and color density.

The receptor object with the intermediate transfer medium put thereon is preferably heated at the heat activation temperature of the heat transferable dye or above. Many of the heat transferable dyes described above have a heat activation temperature of 100 to 200° C. Therefore, the heating is carried out at this temperature or above, preferably at a temperature of about 120 to 160° C. The transfer time may be properly determined. In general, however, the transfer time is preferably 10 to 300 sec, more preferably 60 to 120 sec.

Further, according to a preferred embodiment of the present invention, the step of heating comprises the steps of: after putting the intermediate transfer medium on the receptor object, heating the intermediate transfer medium and the receptor object from room temperature to the heat activation temperature of the heat transferable dye; holding the intermediate transfer medium and the receptor object at the heat activation temperature of the heat transferable dye or above; and then decreasing the temperature of the intermediate transfer medium and the receptor object from the heat activation temperature of the heat transferable dye to room temperature. According to a preferred embodiment of the present invention, from the viewpoint of realizing good transfer, the time required in the step of raising the temperature of the intermediate transfer medium and the receptor object from room temperature to the heat activation temperature of the heat transferable dye is longer than the time in the step of holding the intermediate transfer medium and the receptor object at the heat activation temperature of the heat transferable dye or above.

According to another preferred embodiment of the present invention, the heating is carried out by microwave irradiation. The microwave irradiation is advantageous in that the heating can be simply carried out by means of a microwave oven, for example, also in the home.

The sublimation transfer of the heat transferable dye by utilizing a microwave constitutes still another aspect of the present invention. Specifically, according to the present invention, there is provided a recording method comprising the steps of: printing an ink composition containing a heat transferable dye onto an intermediate transfer medium to form a latent image on the intermediate transfer medium; putting the intermediate transfer medium on the surface of a receptor object; and applying a microwave to the intermediate transfer medium for a sufficient time to sublimate the heat transferable dye and to deposit the sublimated dye onto the surface of the receptor object. According to this aspect of the present invention, ink jet recording may be used to print the ink composition onto the intermediate transfer medium. Further, according to this aspect of the present invention, prior to the application of the microwave, a moisture-retaining liquid is preferably coated onto the backside of the intermediate transfer medium with a latent image printed thereon in order to prevent the intermediate transfer medium from being excessively dried during microwave irradiation. The moisture-retaining liquid basically comprises glycerin as a humectant, a saccharide, and water.

EXAMPLES

The present invention will be described in more detail with reference to the following examples, though it is not limited to these examples only.

In the following examples, the amount added represents the weight of each effective ingredient in terms of % by weight based on the ink composition.

Preparation of Ink Compositions

Ink compositions of Examples 1 to 6 were prepared according to the following formulations.

Example 1

|  | Amount added |
|---|---|
| Yellow SE-5G (Sumitomo Chemical Co., Ltd.) | 5.0 |
| Diethylene glycol monobutyl ether | 8.0 |
| Diethylene glycol monohexyl ether | 3.0 |
| Polyoxyethylene (n = 8) nonylphenyl ethersulfonic acid ammonium salt | 1.0 |
| Glycerin | 6.0 |
| Surfynol 465 | 0.8 |
| Triethanolamine | 0.8 |
| EDTA | 0.05 |
| Ion-exchanged water | Balance |

Yellow SE-5G (Sumitomo Chemical Co., Ltd.) was in a powder form. Therefore, this dye was used as a dispersion prepared by previously adding 20 parts by weight of polyoxyethylene (n=8) nonylphenyl ethersulfonic acid ammonium salt to the dye and dispersing the dye in the polyoxyethylene (n=8) nonylphenyl ethersulfonic acid ammonium salt by means of a disperser mill. The ink composition thus obtained had a viscosity of 4.5 mPa·s at 20° C. and a surface tension of 32 mN/m.

Example 2

|  | Amount added |
|---|---|
| Brilliant Red S-BLF (Sumitomo Chemical Co., Ltd.) | 4.5 |
| Dipropylene glycol monobutyl ether | 7.0 |
| Triethylene glycol monobutyl ether | 2.0 |
| Glycerin | 6.0 |
| Surfynol 465 | 1.0 |
| Triethanolamine | 0.8 |
| EDTA | 0.05 |
| Ion-exchanged water | Balance |

The ink composition thus obtained had a viscosity of 4.3 mPa·s at 20° C. and a surface tension of 31 mN/m.

Example 3

An ink composition was prepared according to the same formulation as used in Example 2, except that the dye was changed to 4.5% by weight of Brilliant Blue S-BL (Sumitomo Chemical Co., Ltd.). The ink composition thus obtained had a viscosity of 4.6 mPa·s at 20° C. and a surface tension of 32 mN/m.

Example 4

|  | Amount added |
|---|---|
| Miketon Polyester Yellow 4G (Mitsui Chemicals Inc.) | 5.0 |
| Ethylene glycol propylene glycol monohexyl ether | 2.0 |
| Triethylene glycol monohexyl ether | 4.0 |
| Diethylene glycol monobutyl ether | 8.0 |
| Surfynol 104 | 1.0 |
| Polyoxyethylene (n = 8) nonylphenyl ethersulfonic acid ammonium salt | 1.0 |
| Ethylene glycol | 3.0 |
| Triethylene glycol | 3.0 |
| 1,5-pentanediol | 2.0 |
| Surfynol 82 | 0.2 |
| Sodium benzoate | 0.1 |
| Tripropanolamine | 0.3 |
| Dipropanolamine | 0.1 |

Miketon Polyester Yellow 4G (Mitsui Chemicals Inc.) was in a powder form. Therefore, as with Example 1, in this example, the dye was used as a dispersion prepared by previously adding 20 parts by weight of polyoxyethylene (n=8) nonylphenyl ethersulfonic acid ammonium salt to the dye and dispersing the dye in the polyoxyethylene (n=8) nonylphenyl ethersulfonic acid ammonium salt by means of a disperser mill. The ink composition thus obtained had a viscosity of 4.8 mPa·s at 20° C. and a surface tension of 30 mN/m.

Example 5

An ink composition was prepared according to the same formulation as used in Example 4, except that the dye was changed to Miketon Polyester Brilliant Blue BG (Mitsui Chemicals Inc.).

The ink composition thus obtained had a viscosity of 4.6 mPa·s at 20° C. and a surface tension of 30 mN/m.

Example 6

An ink composition was prepared according to the same formulation as used in Example 4, except that the dye was changed to Miketon Polyester Red FB (Mitsui Chemicals Inc.).

The ink composition thus obtained had a viscosity of 5.1 mPa·s at 20° C. and a surface tension of 30 mN/m.

The ink compositions of Examples 1 to 6 thus obtained were evaluated as follows.

Evaluation Test 1:

Color-to-color bleeding in printed image on recording paper

The ink compositions of Examples 1 to 6 were loaded into an ink cartridge in an ink jet printer MJ-930C (manufactured by Seiko Epson Corporation), and a blotted image pattern of single colors, yellow, magenta, and cyan, was printed on a Super Fine specialty paper (MJA4SP1, manufactured by Seiko Epson Corporation). The blotted image pattern was inspected for color mixing at the boundary areas between contiguous colors. The bleeding in images was evaluated according to the following criteria.

A: For all the ink compositions, the quality of the prints is equivalent to that of the prints yielded using genuine ink compositions for the printer.

B: For some of the ink compositions, color mixing occurred which was not observed in the prints yielded using genuine ink compositions for the printer.

The results of evaluation were as shown in the following table.

TABLE 1

| Example | Evaluation |
|---|---|
| 1 | A |
| 2 | A |
| 3 | A |

TABLE 1-continued

| Example | Evaluation |
|---|---|
| 4 | A |
| 5 | A |
| 6 | A |

In the above printing test, the penetration of the ink compositions into the recording paper was completed not more than 2 sec after impact of the inks against the recording paper.

In order to examine color-to-color bleeding in printed images for the ink compositions of Examples 1 to 3, the head voltage of the ink jet printer MJ-930C used in the evaluation was increased or decreased to vary the amount of ink droplets. As a result, when the amount of the ink compositions implanted was not more than 160 ng per $5 \times 10^{-3}$ mm$^2$ of the recording paper, good latent images free from color mixing at the boundary areas between contiguous colors could be realized on the recording paper.

From the above results, sublimation transfer of high-quality images onto receptor objects can be expected.

Evaluation Test 2: Ink Jet Stability

A ruled line pattern was continuously printed on 500 sheets of paper of size A4 by means of the same ink jet printer as used in the evaluation test 1 to examine an ink droplet trajectory directionality problem and dropouts of dots. The results were evaluated according to the following criteria.

The dropouts of dots refer to a phenomenon involved in printing, such that the ruled line becomes intermittent due to nozzle clogging in the ink jet head or other unfavorable phenomenon. The ink droplet trajectory directionality problem refers to a phenomenon such that the distance between printed ruled lines is not constant and is increased or decreased.

Dropouts of Dots:

A: For all the ink compositions, the frequency of the dropouts of dots is equivalent to that in the case of printing using genuine ink compositions for the printer.

B: For some of the ink compositions, the frequency of the dropouts of dots is at least 1.5 times that in the case of printing using genuine ink compositions for the printer.

Ink droplet trajectory directionality:

A: For all the ink compositions, the frequency of the ink droplet trajectory directionality problem is equivalent to that in the case of printing using genuine ink compositions for the printer.

B: For some of the ink compositions, the frequency of ink droplet trajectory directionality problem is at least 1.5 times that in the case of printing using genuine ink compositions for the printer.

TABLE 2

| Example | Dropouts of dots | Ink droplet trajectory directionality |
|---|---|---|
| 1 | A | A |
| 2 | A | A |
| 3 | A | A |
| 4 | A | A |
| 5 | A | A |
| 6 | A | A |

Evaluation Test 3: Sublimation Transfer Test (1)

Latent images were formed on the same recording paper as used in the evaluation test 1 by means of the same printer as used in the evaluation test 1. The latent images on the recording paper were then transferred by sublimation transfer onto receptor objects to examine color properties of the transferred dye images.

The following fabrics were used as receptor objects.

Test fabric 1: A blended fabric of cotton and polyester (blending ratio=30:70)
Test fabric 2: A blended fabric of cotton and polyester (blending ratio=50:50)
Test fabric 3: A blended fabric of cotton and polyester (blending ratio=70:30)
Test fabric 4: A blended fabric of cotton and nylon (blending ratio=30:70)
Test fabric 5: A blended fabric of cotton and nylon (blending ratio=50:50)
Test fabric 6: A blended fabric of cotton and nylon (blending ratio=70:30)
Test fabric 7: A blended fabric of cotton and acetate (blending ratio=30:70)
Test fabric 8: A blended fabric of cotton and acetate (blending ratio=50:50)
Test fabric 9: A blended fabric of cotton and acetate (blending ratio=70:30)

In the sublimation transfer, heat treatment was carried out by means of a trouser press. The temperature was set to about 180 to 200° C. (heat activation temperature of heat transferable dyes in Examples 1 to 6=about 110 to 150° C.), and the pushing pressure was set to 200 g/cm$^2$. The heating time was 2 min.

The color properties of the dyes transferred onto the receptor objects were evaluated in terms of OD (optical density) value according to the following criteria.

A: For all the ink compositions, the OD value was not less than 1.5.

B: For some of the ink compositions, the OD value was less than 1.5.

The results were as summarized in the following table.

| Test fabric | Evaluation |
|---|---|
| 1 | A |
| 2 | A |
| 3 | B |
| 4 | A |
| 5 | A |
| 6 | B |
| 7 | A |
| 8 | A |
| 9 | B |

Evaluation Test 4: Sublimation Transfer Test (2)

A sublimation transfer experiment was carried out in the same manner as in the evaluation test 3, except that the receptor object was changed.

A polyester film (thickness 50 µm) and a ceramic tile (thickness 4 mm) with a polyester layer formed thereon were used as the receptor object.

The temperature of the trouser press was set to about 160 to 170° C., and the pushing pressure was set to 200 g/cm$^2$. A linear thermocouple was put between the recording paper and the object to measure a temperature change. In this experiment, the ink composition of Example 1 was used, and the recording paper with an image formed thereon being completely dried was used.

The details and results of the test were as follows.

Polyester Film

The recording paper was put on the top of the polyester film, and the laminate was then heated. In this case, about 3 sec was required for the temperature of the laminate to reach 150° C. or above. The assembly was further heated (at 150 to 170° C.) for additional 90 sec. Thereafter, the object was taken out of the trouser press, and then allowed to cool at room temperature. About 10 sec was required for the temperature to drop down to 110° C. or below.

As with the latent image formed on the recording paper, the image produced on the receptor object had good quality free from significant bleeding and, at the same time, had good color properties. Further, before and after the sublimation transfer, the weights of the recording paper and the receptor object were measured. As a result, it was confirmed that about 28% of the heat transferable dye constituting the latent image yielded on the recording paper was transferred onto the receptor object.

An additional experiment was carried out wherein the transfer time, for which the temperature was held at the heat activation temperature of the heat transferable dye or above, was further shortened. As a result, in the case of a transfer time of 60 sec, the amount of the transferred dye was 21%, and the color properties were also good. In the case of a transfer time of 45 sec, the amount of the transferred dye was 10%, and the color properties were good. In this case, however, as compared with the transfer time of not less than 60 sec, the OD value was lower. Further, when the transfer time was reduced to 30 sec, the amount of the transferred dye was 6% and the OD value was very low and unsatisfactory from the practical point of view.

Ceramic Tile with Polyester Layer Formed Thereon

The recording paper was put on the top of the ceramic tile, and the laminate was then heated. In this case, about 60 sec was required for the temperature of the laminate to reach 150° C. or above. The assembly was further heated (at 150 to 170° C.) for additional 300 sec. Thereafter, the object was taken out of the trouser press, and then allowed to cool at room temperature. About 90 sec was required for the temperature to drop down to 110° C. or below.

As with the latent image formed on the recording paper, the image produced on the receptor object had good quality free from significant bleeding and, at the same time, had good color properties. Further, before and after the sublimation transfer, the weights of the recording paper and the receptor object were measured. As a result, it was confirmed that about 32% of the heat transferable dye constituting the latent image yielded on the recording paper was transferred onto the receptor object.

An additional experiment was carried out wherein the transfer time, for which the temperature was held at the heat activation temperature of the heat transferable dye or above, was further shortened. As a result, in the case of a transfer time of 150 sec, the amount of the transferred dye was 10%, and the color properties were also good. In this case, however, as compared with the transfer time of not less than 300 sec, the OD value was lower. When the transfer time was further shortened, the amount of the transferred dye was less than 10% and the OD value was very low and unsatisfactory from the practical point of view.

Evaluation Test 5: Sublimation Transfer Utilizing Microwave

A recording paper with a latent image formed thereon was prepared in the same manner as in the evaluation test 1. In this experiment, the ink composition of Example 2 was used as the ink composition. An aqueous moisture-retaining solution composed of 30% by weight of glycerin, 60% by weight of water, and 10% by weight of maltitol was coated on the backside of the recording paper.

The recording paper in its recorded face was applied to a polyethylene mug while pressing by means of a rubber band (average pushing pressure 80 g/cm$^2$). The assembly was placed in a microwave oven, and a microwave was applied for 3 min. Thereafter, the rubber band was removed, and the recording paper was separated. As a result, it was confirmed that a high-quality image was transferred onto the surface of the mug.

What is claimed is:

1. A sublimation transfer ink-jet recording method comprising the steps of: providing an ink composition comprising a heat transferable dye, a glycol ether, an acetylene glycol surfactant and water; said heat transferable dye having a heat activation temperature at which the dye sublimates, said heat activation temperature being above room temperature; printing the ink composition by ink jet recording onto an intermediate transfer medium to form a latent image on the intermediate transfer medium; putting the intermediate transfer medium on the surface of a receptor object; and heating the intermediate transfer medium and the receptor object at a sufficient temperature and for a sufficient time to sublimate the heat transferable dye and to deposit the sublimated dye onto the surface of the receptor object, wherein the heating comprises the steps of raising the temperature of the intermediate transfer medium and the receptor object from room temperature to the heat activation temperature of the heat transferable dye or above; holding the intermediate transfer medium and the receptor object at the heat activation temperature of the heat transferable dye or above; and then decreasing the temperature of the intermediate transfer medium and the receptor object to room temperature.

2. The recording method according to claim 1, wherein the receptor object has a surface containing at least 50% of a polyester, a nylon, or an acetate.

3. The recording method according to claim 2, wherein the receptor object is a cotton-blended fabric containing at least 50% of a polyester, a nylon, or an acetate.

4. The recording method according to any one of claim 1, wherein the penetration of ink droplets, deposited onto the intermediate transfer medium, into the intermediate transfer medium is completed within 2 sec.

5. The recording method according to claim 1, wherein not less than 10% of the total weight of the heat transferable dye in the latent image formed on the intermediate transfer medium is transferred onto the receptor object.

6. The recording method according to claim 1, wherein the intermediate transfer medium is paper and the amount of the ink deposited onto the paper is not more than 160 ng per $5 \times 10^{-3}$ mm$^2$ of the paper.

7. The recording method according to claim 1, wherein the time required in the step of raising the temperature of the intermediate transfer medium and the receptor object from room temperature to the heat activation temperature of the heat transferable dye is longer than the time in the step of holding the intermediate transfer medium and the receptor object at the heat activation temperature of the heat transferable dye or above.

8. The recording method according to claim 1, wherein the heating comprises applying a microwave to the intermediate transfer medium.

9. The recording method according to claim 8, wherein, prior to the application of the microwave, a moisture-retaining liquid is coated onto the backside of the intermediate transfer medium with a latent image printed thereon.

10. The recording method according to claim 1, wherein the glycol ether is one member or a mixture of two or more members selected from the group consisting of di- or tri-ethylene glycol mono-butyl ether, mono- or di-propylene glycol mono-butyl ether, di or tri-ethylene glycol mono-pentyl or -hexyl ether, propylene glycol mono- or di-ethylene glycol mono-butyl, -pentyl, or -hexyl ether, and ethylene glycol mono- or di-propylene glycol mono-butyl, -pentyl or -hexyl ether.

* * * * *